Feb. 16, 1954 — H. R. ROGERS — 2,669,159
REARVIEW MIRROR ASSEMBLY
Filed June 29, 1950
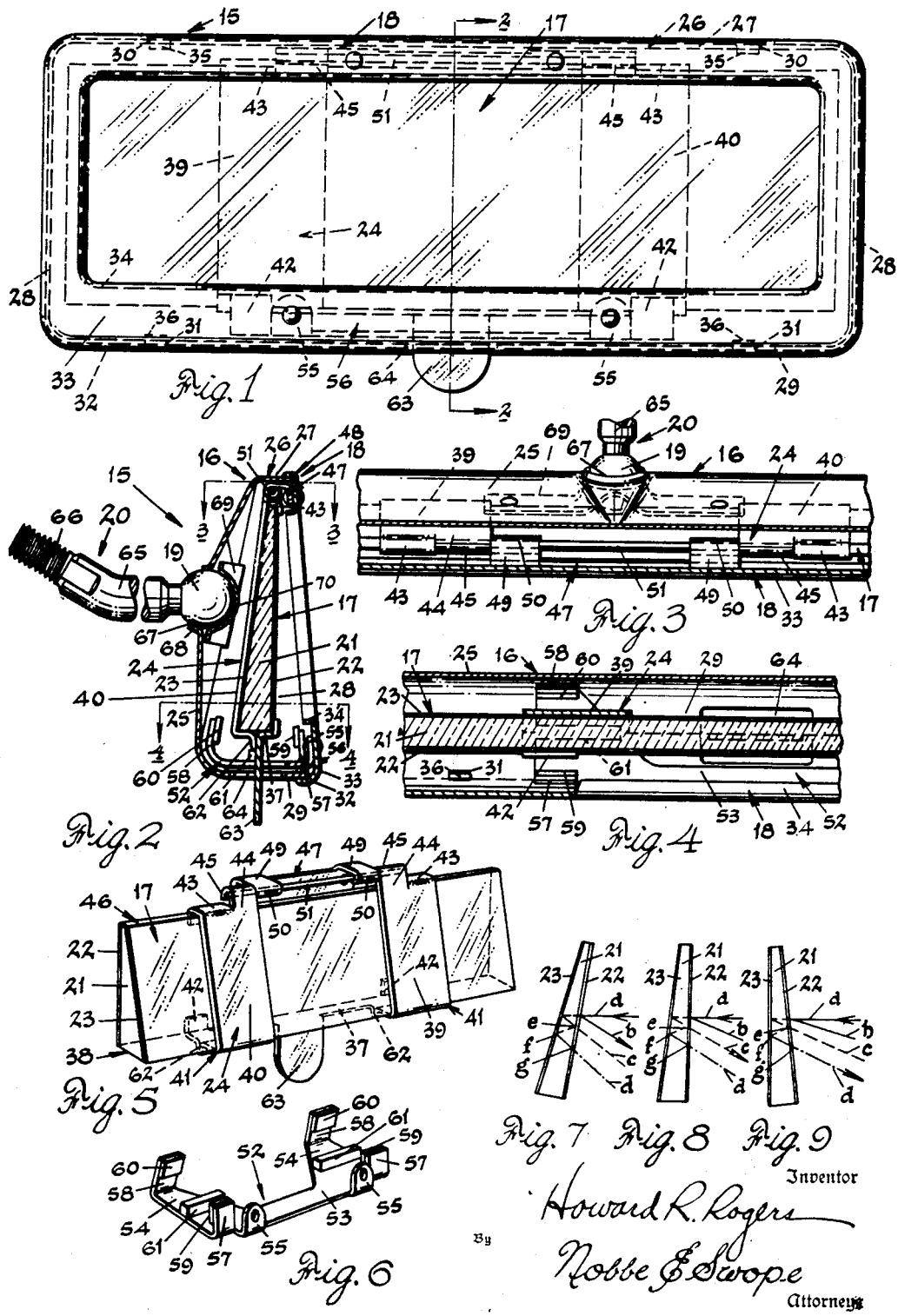
Inventor
Howard R. Rogers
By Nobbe & Swope
Attorneys Patented Feb. 16, 1954

2,669,159

UNITED STATES PATENT OFFICE 2,669,159

REARVIEW MIRROR ASSEMBLY

Howard R. Rogers, Toledo, Ohio, assignor to Libbey-Owens-Ford Glass Company, Toledo, Ohio, a corporation of Ohio Application June 29, 1950, Serial No. 171,199

3 Claims. (Cl. 88—77)

This invention relates broadly to improvements in rear view mirrors that are used in automobiles and the like.

The primary purpose in the use of a rear view mirror in an automobile is of course to provide the driver with a satisfactory view of the road or traffic behind him under the various conditions of driving. It has heretofore been proposed to employ a rear view mirror having two mirror surfaces of different reflectivities and being adjusted so that either reflective surface may be brought into operative viewing position by the driver of the vehicle, one reflective surface being preferably in the form of an ordinary mirror for use in day driving and the other providing a mirror for night driving which will reduce the brilliance of the reflected headlights of an automobile approaching from the rear.

In the co-pending application of Dwight W. Barkley, Serial No. 788,120, now abandoned, there is disclosed and claimed an improved type of prismatic rear view mirror device which provides the driver with a personal selection of three or more intensities of images of road conditions behind him. Such a mirror permits the driver to make a choice of the images of various brightness, each image being of the common, limited rear field of view so as to obtain maximum visibility with the minimum of glare best suited to his individual eye glare tolerance and visual acuity under all the varying light intensities present under modern day and night driving conditions.

This invention is primarily concerned with the mounting of the improved type of prismatic mirror disclosed in the above copending application and to obtain desired angular adjustments of the mirror by means of said mounting in a novel manner.

It is therefore an aim of this invention to provide an improved type of mounting by which a prismatic mirror may be oriented in predetermined positions to selectively locate any one of three different image intensities of the same limited common field of view in the normal line of vision of the driver.

An object of this invention is the provision of such a mounting for a rear view mirror embodying simple yet effective means by which the driver may angularly adjust the mirror to predetermined positions at will to selectively locate in the predetermined positions of the driver's eyes a first, second or third image of the common rear field view.

Another object of the invention is the provision of an improved mounting of the above character wherein the component parts enable tilting movement of the mirror to any one of three positions by finger-tip control to give the desired intensity of image, without disturbing the adjustment of the mirror in relation to the driver, and for effectively maintaining the mirror in any of the selected positions.

Another object of the invention is the provision of an improved mounting of the above character wherein a prismatic form of mirror is supported by a freely swingable member that may be restrained from movement by its engagement with suitably disposed magnets to alternately and selectively locate image reflections of the common rear field view and of three different intensities in the normal line of vision of the driver.

A further object of the invention is the provision of an improved mounting of the above character and the fabrication of this mounting in a novel manner, the associated parts thereof being of relatively simple design and function to obtain a compact rear view mirror assembly in an efficient manner.

Other objects and advantages of the invention will become more apparent during the course of the following description when taken in connection with the accompanying drawings.

In the drawings, wherein like numerals are employed to designate like parts throughout the same:

Fig. 1 is a front view of a rear view mirror assembly as constructed in accordance with the invention;

Fig. 2 is a vertical transverse sectional view taken through the mirror assembly on line 2—2 of Fig. 1;

Fig. 3 is a longitudinal horizontal sectional view taken on line 3—3 of Fig. 2;

Fig. 4 is a similar sectional view taken on line 4—4 of Fig. 2;

Fig. 5 is a perspective view of the mirror element and the supporting bracket therefor;

Fig. 6 is a perspective view of a spider plate on which the magnetic members are carried;

Figs. 7, 8 and 9 are diagrammatic views wherein the mirror element is disposed to selectively obtain the desired power of reflection.

According to this invention, the rear view mirror mounting, shown in Fig. 1 and designated in its entirety by the numeral 15, comprises a substantially rectangular metal housing or case 16, open at the front thereof and in which a mirror element 17 is arranged. The open front of the case is enclosed around its perimeter by a channel or rim-like frame 18, said frame being attachable to the case 16 and so formed as to carry the mirror e'ement 17 as will be more fully hereinafter described. To provide for supporting the mirror mounting 15 in a vehicle so that it may be bodily adjusted to properly position the reflecting surfaces of the mirror element 17 for different drivers, the case 16 is carried on a truncated ball 19 of a mirror mounting bracket, designated generally at 20.

As herein provided, the mirror element 17 comprises at least two mirror reflecting surfaces or reflective means associated with each other and arranged, one behind the other, with their upper edges in converging relationship and with the lower edges more widely spaced apart. The mirror reflective means or coatings deposited on the front and rear supporting surfaces may thus be arranged in a non-parallel relationship by provision of a prism or a support of prismatic form. As a suitable support for the mirror reflective coatings, transparent bodies such as glass or plastic prisms or sheets of the same arranged in prismatic forms may be employed.

As is set forth in the above mentioned co-pending application Serial No. 788,120, the desired angle between the two mirror reflective means or coatings, which form a front and a rear mirror disposed at such angle to each other, is preferably of the order of 3¼ degrees, although it will be understood that angles of from 2 to 10 degrees may be employed between the mirrors without departing from the scope of the invention. More clearly illustrated in Fig. 2, the mirror element 17 consists of a support of glass or other transparent material 21 which is so wedge-shaped in cross section. In this instance, said mirror is provided with a front partially transparent mirror reflective film 22 and a rear mirror reflective film 23 carried by the support 21.

The front reflective film 22 is semi-transparent and of substantially no light absorption. Preferably it will be of a reflectivity of 10% to 30% and in such case said mirror film might be used in normal night driving and in daytime driving under snow and sun glare conditions.

The rear reflective film 23 is preferably opaque, although it may also be semi-transparent preferably of less transparency, however, than the front reflective film 22. If said film 23 is transparent, it may or may not be backed with an opaque coating. As herein provided, the rear reflective film 23 is employed for normal daytime driving purposes and accordingly is highly reflective, and as a coating on a plane sheet of glass would have a reflectivity ranging from 55% to 95% or more.

When mounted in a suitable housing or case, as is herein provided and fixed in a normal viewing position within an automobile, the reflective films 22 and 23 of the mirror element 17 will provide for abnormal driving conditions as well as day and night driving and for the wide variations in eye sensation of automobile drivers by providing at least three or more intensities of images of the rear road conditions, which the driver may select as the rear lighting conditions and his eye sensitivity to glare and visibility vary. This choice of image intensity is made by his selectively positioning the prismatic rear view mirror by angular adjustment to alternatively locate the various images of different intensities of the same limited common field of rear view in the normal line of sight. The rear view mirror 17 may thus provide a choice of at least three image intensities which may be, for example, approximately 55% to 95%, between 10% and 30% and of over 4.5% up to 12% approximately of the incident light falling upon the rear view mirror.

This last image intensity of substantially 4.5% is created due to internal reflection between the mirror reflective films 22 and 23 by reason of the fact that they are arranged at an angle to one another. Since the angle of incident of the image beam reflecting from the front mirror film 22 will of course vary from the image beam reflecting from the rear mirror film 23, according to the desired wedge angle, as for example of 3¼ degrees, there will also be internal reflection from said front mirror film back to the rear mirror film and again to and through the front mirror film. This image beam therefore will be of a greatly diminished intensity as the light transmission is progressively reduced by internal reflection and will be usable mainly under intense glare conditions at night or under bad glare conditions produced by sun or snow or upon rainy night driving.

As will be noted in Figs. 7, 8 and 9, the light incident upon the mirror and originating at the rear of the driver along the light beam $a$, is reflected as the several image beams $b$, $c$ and $d$. In each of these figures, the beam $b$ is a reflection directly from the front mirror film 22. This is shown as reflected to the driver's eyes in Fig. 7, but in Figs. 8 and 9, said beam is reflected into the car above the driver's eyes and is not visible to him. The beams $c$ and $d$ in Fig. 7 are reflected below the driver's eyes so that he clearly sees the reflected beam $b$ only.

In Fig. 8, the reflected beam $c$ alone reaches the driver's eyes, and in Fig. 9, the mirror 17 has been shifted angularly further to bring the reflected beam $d$ into the driver's eyes. In Fig. 8 this same beam $d$ is below the normal line of sight of the driver. The selective shifting of the mirror in Fig. 9 brings the beam $d$ only into the driver's eyes, and the other reflected beams $b$ and $c$ are directed out of line with the driver's eyes and reflect into the top of the car.

In each of Figs. 7, 8 and 9, it will be appreciated that the reflected beam $b$ originates by reflection from the front mirror film 22. Likewise, the reflected beam $c$ results from first reflection from the rear mirror film 23. Such beam, however, passes through the front mirror film 22 twice and is modified by the light transmission of such front mirror film. The incident light is decreased in intensity by the light reflection properties of the front mirror film 22 primarily, the absorption of said film being substantially negligible. Thus, the incident light is reduced by the reflection of the beam $b$ so that not all the incident light reaches the rear mirror film 23. The reflection ability of this mirror film 23 then determines the amount of light returned forwardly but before the reflected beam issues from the prism form, a further reflection occurs at $e$ by the front mirror film. Thus the beam $c$ is of a reduced intensity as compared to the incident beam.

In Figs. 7, 8 and 9, the origin of the beam $d$ will be seen to be by internal reflection within the prism form by the cooperative action of the front mirror film 22 and of the rear mirror film 23. Thus the incident beam after reduction in intensity by light reflected as beam $b$ by the front mirror film 22 passes to the rear mirror film 23 and is reflected back therefrom. As just explained above, this reflected beam passes out of the mirror as beam $c$ but in so doing is subject to partial reflection at the point $e$ by the front mirror film. Thus, the incident light is further reduced by the loss of beam c before the internally reflected light arrives back at the rear mirror film again and is reflected a second time at point f. Such reflection again exerts a reduction in intensity and a further reduction in light intensity of the beam d occurs as some light is again reflected at point g as the beam passes out through the front mirror film 22.

Thus the mirror element 17 by its prismatic formation, and through a novel means for changing the angular position thereof, may be employed according to the driver's desire to reflect rear road conditions in image intensities of a high, medium or low power. In other words, the sensitivity of the driver's eyes can be accommodated to daytime, nighttime or unusual driving conditions by his selection of the mirror reflectivities. Rear view mirror mountings, as constructed in accordance with my invention, thus, provide for stepwise angular positioning of the mirror element 17 upon selection by the driver and for retaining said mirror in such adjusted position until a further selection of light reflectivity is desired.

As herein shown, the support 21 for the mirror 17 is carried within the open front of the case 16 and the vision field thereof, as provided by the front and rear reflecting surfaces 22 and 23 respectively, is defined by the rim-like frame 18 which surrounds the perimeter of the case. More particularly, the mirror element 17 is supported within a bracket 24 hingedly associated with the frame 18 so that said mirror can be easily moved in a stepwise manner to determine the angularity of position of the mirror and thereby the intensity of image reflection to be directed toward the eyes of the driver.

The enclosing metal housing or case 16, as previously set forth, is of a generally rectangular form and is substantially wedge shape so that the rear wall 25 thereof slopes downwardly and the top surface of the case is considerably narrower than the bottom surface. These surfaces are defined by portions of a forwardly directed peripheral flange 26 having a top wall portion 27, side wall portions 28 and bottom wall 29. In vertical relation to each other, and equally spaced from the side walls 28, there are located in the top wall 27 and bottom wall 29, pairs of slotted openings 30 and 31 which receive portions of the frame 18 to secure the same to the case.

This frame is generally shaped as a rectangular band, conforming to the outline of the case 16, and is of channel shape in cross-section, having an outer wall 32, a centrally disposed web 33 and an inner wall 34 which is somewhat narrower than the outer wall 32 and actually is formed to present a neat appearing rolled edge. The outer wall 32 of the frame is adapted to overlay or surround the peripheral flange 26 of the case and effect a compact nesting relationship therewith. For this purpose, the frame 18 is provided with pairs of ears 35 and 36 along the upper and lower edge portions of the outer wall 32 in corresponding positions to the slots 30 and 31 in the top and bottom walls 27 and 29 of the flange 26 and which are bent inwardly so as to engage the same and lock therein when the frame is urged into its nesting relation with reference to the case.

In this rear view mirror mounting, the frame 18 serves not only to enclose the open front of the case 16 thereby defining, to some extent, the visual area of the mirror element 17 but is more particularly adapted to carry said mirror by means of the bracket 24 and further provide a support for the means by which the mirror may be predeterminably located in its stepwise movements. Thus sub-assembly of the frame and bracket may be efficiently accomplished and when the frame 18 is attached to the case 16, the mounting 15 will be complete.

The bracket 24 is substantially angular in cross section and otherwise presents a U-shaped structure or outline. As will be noted in Fig. 5, the bracket is adapted to carry the mirror element 17 on the base thereof which constitutes the web of the U-shaped structure. This base, as indicated at 37, extends longitudinally with respect to the said mirror element and actually spans only a portion of the bottom 38 of the support 21 thereof. At the opposite ends of the web or base 37 there are formed legs 39 and 40 which project rearwardly across the balance of the bottom of the prismatic support 21 and are then directed upwardly across the rear surface of said support. The bottom 38 of the support will thus be supported on the web or base 37 of the bracket 24 and adjoining portions of the legs 39 and 40 of the U-shaped structure. More particularly, one corner of the bottom 38 is received in the area of bending 41 in the legs 39 and 40 while the opposite corner thereof is engaged by a pair of fingers 42 bent upwardly from the forward edge of the base 37. The area of bend 41 in each of the legs 39 and 49 is thus determined by the width of the bottom portion 38 of the prismatic support 21 and in relation to the fingers 42.

At the upper extremity of each leg 39 and 40, the ends are divided to provide a forwardly directed finger 43 along the outer portion of each leg. The remaining upwardly directed portion of each leg constitutes a tongue 44 on the inner side thereof that is shaped at its extremity to provide an inverted hook or hanger portion 45 by which the bracket 24 may be pivotally supported as will be hereinafter more fully described.

The upper fingers 43 of each leg, when bent downwardly over the top edge 46, or narrower side of the prismatic support, urge one corner of the wider bottom portion 38 of the prism into the bent areas 41 while the opposite corner of said bottom portion is engaged by the fingers 42. The bracket 24, as shown in Fig. 5, may thus be easily mounted with respect to the mirror support 21 which will be secured therein when the fingers 43 at the top and the similar fingers 42 along the bottom are bent into engaging relation with the upper and lower corners thereof.

The bracket 24 is pivotally associated with the frame 18 by means of a bifurcated plate 47 that is secured by welding, riveting or like methods to the web 33 on its inner surface between the walls 32 and 34 and in the upper portion 48 of said frame. The bifurcated plate has outwardly directed tabs 49 projected from each end and the extremity of each tab is suitably rolled to form a sleeve 50 in which a pintle 51 is carried. Preferably the tabs 49 and sleeves 50, integrally formed therewith, are spaced apart a distance substantially equal to the space between the hanger portions 45 of the bracket 24, as shown in Fig. 3; the outer ends of the pintle 51 being receivable in said hangers so as to carry the mirror element 17 in a freely swingable manner.

As previously noted, the channel-like frame 18 in addition to carrying the mirror element 17, in a general sense, also provides a support for means by which the mirror element may be selectively located in its several positions of angularity to dispose the desired reflecting surface or generated image reflection of one intensity or the other in the driver's line of vision. As herein provided, permanently magnetized members are arranged to engage the bracket 24 as it is swung laterally on the pintle 51 and by reason of their magnetic attraction hold the same at either limit of a prescribed motion, as determined by their positions or at an intermediate position located therebetween to afford a three positional control for the mirror element and permit the driver to selectively locate said mirror element in order that he may alternatively employ the front reflecting surface or the rear reflecting surface, or obtain the much lower power of reflection created by the second reflection from the rear mirror surface. Thus the bracelet 24 is of a paramagnetic material and the mirror element 17 may be swung in either direction from the position shown in Fig. 2 or Fig. 8 and it will be maintained in said position or in a position approximating that shown in Fig. 7 or that shown in Fig. 9.

According to this invention, these permanently magnetized members are generally carried by the frame 18 so that they will be engaged by the bracket 24, either in the area of bend 41 in the legs 39 and 40 at one lower corner of the prismatic support 21 or at the fingers 42 at the opposite lower corner of said support. More specifically, these magnetic members are carried by a spider bracket 52 that is located in the lower portion of the case 16 and fixedly secured to the frame 18.

The spider 52 is generally U-shaped having a longitudinally disposed web portion 53 from the ends of which are rearwardly extending legs 54. The spider 52 is secured to the frame 18 by means of upwardly struck tabs 55 which are attached to the inner surface 33 of the frame as by welding, riveting or like methods in the lower portion 56 of the said frame. Adjacent the tabs 55, as shown in Fig. 6, and outwardly thereof along the forward edge of the spider 52 there are upwardly directed tabs 57. Directly opposite the tabs 57 and at the extremities of the legs 54 similar upwardly directed tabs 58 are formed, the pairs of tabs 57 and 58 rising into the path of movement of the bracket 24 and thereby limiting its motion in either direction. Suitably magnetized blocks 59 and 60 are mounted on the tabs 57 and 58, respectively, to engage the bracket in its lower corners as above described.

Midway between the pairs of tabs 57 and 58 and magnetic blocks 59 and 60 mounted thereon, a pair of magnetized bars 61 are secured to the web 53 of the spider 52 in longitudinal alignment with one another. The bars 61 cooperate to engage the bracket 24 at a midpoint of its motion and for this purpose, the web bridging portion 37 of said bracket 24 is provided with downwardly directed ridges 62 which are relatively thin in cross section. The ridges 62 are formed by crimping the said bridge along a line substantially parallel to the longitudinal axis of the mirror support 21. The ridges 62, being of substantially small surface area, will only be engageable by said bars 61 as the bracket 24 is moved thereover and consequently the field of magnetic influence set up will not be sufficient to interfere with movement of the bracket toward either the magnetic blocks 59 in one direction or the magnetic blocks 60 in the opposite direction. Now when the bracket 24 is urged in one direction or forwardly within the case 16, the fingers 42 will engage the magnetic blocks 59 and when said bracket is carried or swung rearwardly on the pintle 51 in the opposite direction, the legs 39 and 40 thereon will engage the magnetic blocks 60. Substantially centrally these extremities of motion, the bars 61 engage the downwardly directed ridges 62 of the bracket to establish an intermediate or third position.

The bracket 24 is manually swung on the pintle 51 by means of a finger grip 63 located between the legs 39 and 40 and bent downwardly from the web portion 37 at a point substantially midway between its ends. To allow ample movement of the grip 63, the spider 52 is shaped between the legs 54 so as not to interfere therewith.

It will now be seen that during sub-assembly operations of the mounting, the frame 18 may be provided, by the spider 52, with magnetic members 59, 60 and 61 while it is disassociated from the case 16. Also that before actual assembly, the bracket 24 may be swingably suspended on the pintle 51, carried by the plate 47, by means of the integral hangers 45. In assembling the frame with the case, the finger grip 63 is inserted in a slot 64 provided in the bottom flange wall 29 of said case. The frame 18 is now disposed so that the ears 35 along the upper portion of the wall 32 will enter the related slots 30 in the top wall 27 of the flange; upon swinging the frame inwardly toward the case, the opposite pair of ears 36 will ride or be forced over the edge of the bottom wall 29 and snap into the related slots 31 provided therein. The parts are now arranged as shown in Figs. 1 and 2, and the mirror disposed in viewing position.

The mirror mounting is bodily attached to the framework of an automobile by the mounting bracket 20 which is conventionally adapted to support the same so that it can be tilted to accommodate drivers of different height or seating preference within the car. The mounting bracket 20 comprises an arm 65 at one end of which the truncated ball 19 is formed. At the opposite end thereof, the arm 65 has a threaded shank 66 for attaching purposes. The arm 65 is extended through an opening 67 in the rear wall 25 of the case 16 until the ball 19 is seated in a spherical bearing seat 68 formed concentrically with said opening. The ball is frictionally retained in said seat or bearing 68 by an elastic metal strap 69 having a bearing portion 70 engaging the ball and being spherically formed to conform therewith. The strap is secured in any suitable manner to the wall 25 of the case and the bearing portion 70 coacts with the bearing seat 68 to frictionally grip the ball 19 and maintain the mirror mounting 15 stationary unless it is bodily adjusted according to the individual preference of the driver.

In use, the rear view-mirror mounting 15 for mirror element 17 is first adjusted upon the truncated ball 19 to the proper angular position for the driver of the automobile, after which the mirror is tilted upon the horizontal axis afforded by the pintle 51 to selectively bring any one of the light beams b, c or d to the driver's eyes in his normal line of vision as illustrated in Figs. 7, 8 and 9. Tilting of the mirror element is easily and quickly effected by movement of the same in the proper direction with the exercise of little or no care or attention on the part of the driver. Likewise, the tilting of the mirror will in no way affect the adjustment of the mounting 15 on the ball 19 once it has been adjusted to suit the particular driver. The frictional grip afforded by the seat 68 in the case wall 25 and the seat 70 in the strap 69 is such that they will hold the mirror firmly in the initially selected position and the preferred intensity of reflection will be obtained in the same field of rear view vision.

From the above, it will be seen that upon swinging of the mirror first in one direction, and then in the other, the bracket 24 will carry the mirror element 17 between the limits of its movement as established by the pairs of magnetic blocks 59 and 60. Also that when traversing this movement in either direction, the action of the bracket 24 may be interrupted by engagement of the ridges 62 with and on the magnetic blocks 61. Actually this intermediate positioning of the mirror 17 by the bracket 24 will be that normally assumed by the mirror since when so located, as is shown in Fig. 2 or in Fig. 8, the image reflection will be of the intensity most accommodating to the driver for daytime driving purposes from the rear mirror film 23 and in the order of 55% to 95%. During this period of use and location, the image reflections will be directed along the light beam c while the beams b and d will be directed either above or below the visual range of the driver's eyes.

Should it become desirable to reduce the intensity of light received into the mirror from rear road conditions, the finger grip 63 is engaged and pushed rearwardly, swinging the bracket 24 on the pintle 51 until the legs 39 and 40 engage the magnetic blocks 60. Now the mirror 17 will be disposed as is seen in Fig. 7 when the beam b from the front reflecting surface 22 will be in the line of the driver's vision and the beams c and d directed below his eye level. The image reflectivity will now be of a lower power, as for example from 10% to 30%, more suitable for nighttime driving and consequently less than those emanating from the rear reflecting surface along the beam c.

Alternatively the driver may select the lowest image reflection of from 4.5% up to 12% as obtained from the internal reflection from the rear reflecting surface 23 to the front reflecting surface 22 and outwardly again after the second reflection from the rear surface along beam d. To obtain this lowest power of reflectivity, the finger grip 63 is pulled forwardly in the slot 64 until the fingers 42 of bracket 24 engage the magnetic blocks 59 at which time the mirror support will be located in an angular position substantially as that shown in Fig. 9 when the beam d will be directed in the line of vision of the driver while beams b and c of the next higher reflectivities will be projected above his eye level in the top of the car.

From the foregoing description, it will be apparent that there is herein provided a mounting for prismatic mirrors having a number of important advantages. It is particularly useful as a rear view mirror for automobiles under present-day driving conditions. It can be easily and quickly adjusted for use in the daytime, for use at night or under driving conditions of intensely brilliant car lights, sun or snow glare or other conditions of light reflection that become extremely trying to the eyes of the driver. In daytime use, it will give a clear image without excessive glare. In nighttime use, it will give a clear image without glare from the bright headlights now commonly in use. And by the cooperation of the mirror films on the prismatic support, a clear image will be presented to the driver through the third reflection despite the brilliant intensity of the light received on or in the mirror. The mirror mounting itself is essentially novel in the relationship of its associated parts and the simplicity with which they can be efficiently assembled in a compact unit.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. A rear view mirror for automobiles and the like, comprising a supporting case including a rear wall provided with mounting means therefor and open at the front thereof, a frame attached to said case and surrounding the opening thereof, a bifurcated member secured to the upper portion of said frame and directed inwardly within the case, a horizontal pintle carried in the spaced ends of said bifurcated member, a mirror element comprising a transparent support of prism form having two reflective surfaces of different reflective values upon opposite surfaces thereof disposed at an angle to one another and viewable through the open front of said case, a paramagnetic bracket member carrying the mirror element and embodying a substantially L-shaped body portion including a base upon which the mirror element is supported and upstanding legs engaging the rear surface of the mirror element, the base of said bracket member having upstanding bent fingers engaging the front surface of the mirror element adjacent the bottom edge thereof while the ends of the upstanding legs have forwardly and downwardly bent fingers engaging the front surface of said mirror element adjacent its upper edge, said upstanding legs being also provided with hanger portions for hingedly supporting said bracket member on said pintle, a finger grip carried by said bracket member and projecting downwardly beneath said case and by which swinging movement of the bracket member within the case can be effected by the driver to bring the desired reflecting surface of the mirror element into the driver's view, a second bifurcated member secured to said frame in the lower portion of the case and directed inwardly thereof, and permanent magnets carried by second bifurcated member and engageable by the bracket member carrying the mirror element for maintaining said mirror element in predetermined selected position.

2. A rear view mirror for automobiles and the like, comprising a supporting case including a rear wall provided with mounting means therefor and open at the front thereof, a frame attached to said case and surrounding the opening thereof, a bifurcated member secured to the upper portion of said frame and directed inwardly within the case, a horizontal pintle carried in the spaced ends of said bifurcated member, a mirror element comprising a transparent support of prism form having a front and rear supporting surface at an angle to each other and viewable through the opening of said case, semi-transparent non-light absorptive mirror reflecting means on said front supporting surface and forming a front mirror providing a first image of predetermined intensity, other mirror reflecting means on said rear supporting surface and forming a rear mirror providing a second image of different intensity by reflection through said front mirror reflecting means, said rear mirror reflecting means further cooperative with said front mirror reflecting means to provide by internal reflection within the prism form and by reflection through said front mirror reflecting means a third image of reduced intensity, a paramagnetic bracket member carrying the mirror element and embodying a substantially L-shaped body portion including a base upon which the mirror element is supported and upstanding legs engaging the rear surface of the mirror element, the base of said bracket member having upstanding bent fingers engaging the front surface of the mirror element adjacent the bottom edge thereof while the ends of the upstanding legs have forwardly and downwardly bent fingers engaging the front surface of said mirror element adjacent its upper edge, said upstanding legs being also provided with hanger portions for hingedly supporting said bracket members on said pintle, a finger grip carried by said bracket member and projecting downwardly beneath said case and by which swinging movement of the bracket member within the case can be effected by the driver to angularly adjust said mirror element to selectively reflect any one of three different image intensities of a limited common rear field of view, a second bifurcated member secured to the lower portion of said frame and disposed within the case, said second bifurcated member having pairs of laterally opposed upstanding bent fingers disposed in the path of movement of said bracket, permanent magnets secured to the pairs of upstanding fingers for engaging said bracket member to maintain the mirror element in predetermined angular positions, and magnetic means carried by the second bifurcated member for maintaining said bracket member and mirror element carried thereby in an intermediate angular position.

3. A rear view mirror for automobiles and the like, comprising a supporting case including a rear wall provided with mounting means therefor and open at the front thereof, a frame attached to said case and surrounding the opening thereof, a bifurcated member secured to the upper portion of said frame and directed inwardly within the case, a horizontal pintle carried in the spaced ends of said bifurcated member, a mirror element comprising a transparent support of prism form having a front and rear supporting surface at an angle to each other and viewable through the opening of said case, semi-transparent non-light absorptive mirror reflecting means on said front supporting surface and forming a front mirror providing a first image of predetermined intensity, other mirror reflecting means on said rear supporting surface and forming a rear mirror providing a second image of different intensity by reflection through said front mirror reflecting means, said rear mirror reflecting means further cooperative with front mirror reflecting means to provide by internal reflection within the prism form and by reflection through said front mirror reflecting means a third image of reduced intensity, a paramagnetic bracket member carrying the mirror element and embodying a substantially L-shaped body portion including a base upon which the mirror element is supported and upstanding legs engaging the rear surface of the mirror element, the base of said bracket member having upstanding bent fingers engaging the front surface of the mirror element adjacent the bottom edge thereof while the ends of the upstanding legs have forwardly and downwardly bent fingers engaging the front surface of said mirror element adjacent its upper edge, said upstanding legs being also provided with hanger portions for hingedly supporting said bracket member on said pintle, a finger grip carried on said bracket member and projecting downwardly beneath said case and by which swinging movement of the bracket member within the case can be effected by the driver to angularly adjust said mirror element to selectively reflect any one of three different image intensities of a limited common rear field of view, a second bifurcated member secured to the lower portion of said frame and disposed within the case and including a base and horizontally disposed leg portions, said base and leg portions each having pairs of aligned upstanding bent fingers, permanent magnets secured to the aligned pairs of upstanding fingers and disposed in predetermined positions relative to the angular movement of the bracket member, a third pair of permanent magnets located on the base of said second bifurcated member in longitudinal alignment with one another and substantially midway between the first and second pairs of aligned permanent magnets whereby the said bracket member will be maintained in any one of three predetermined angular positions to obtain either a first image of predetermined intensity from the front reflecting means, a second image of predetermined intensity from the rear reflecting means, or a third image of reduced intensity by cooperation of the front reflecting means and the rear mirror reflecting means by internal reflection from the said mirror element.

HOWARD R. ROGERS.

References Cited in the file of this patent

UNITED STATES PATENTS

| Number | Name | Date |
| --- | --- | --- |
| 1,913,874 | Folberth et al. | June 13, 1933 |
| 2,341,098 | Hausen | Feb. 8, 1944 |
| 2,469,207 | Roedding | May 3, 1949 |
| 2,502,699 | Budreck | Apr. 4, 1950 |

FOREIGN PATENTS

| Number | Country | Date |
| --- | --- | --- |
| 362,622 | Great Britain | Dec. 10, 1931 |